UNITED STATES PATENT OFFICE.

EUDO MONTI, OF TURIN, ITALY.

PROCESS FOR THE MANUFACTURE OF GRAPE EXTRACT.

1,401,351. Specification of Letters Patent. Patented Dec. 27, 1921.

No Drawing. Application filed November 19, 1919. Serial No. 339,206.

*To all whom it may concern:*

Be it known that I, EUDO MONTI, a subject of the King of Italy, residing at Turin, in the Kingdom of Italy, have invented certain new and useful Improvements in Processes for the Manufacture of Grape Extract; and I do hereby declare the following to be a full, clear, and exact description of the invention, such as will enable others skilled in the art to which it appertains to practice the same.

The present invention relates to improvements of the processes described and claimed in my United States Patent No. 1,167,066, dated Jan. 4, 1916, and in my co-pending application Serial No. 123,563.

The objects of my invention are to simplify the preparation and improve the quality of products derived from grapes; and more specifically to prevent fermentation of the grapes prior to or during the preparation of the manufactured product. A further special object is to separately utilize the different constituents of natural grapes, such as grape sugar and grape extract, in order to obtain from the same grapes, non-alcoholic wine and syrup, honey, sugar, jellies or marmalades.

It has been found difficult to prevent fermentation of grapes transported from the place where they are harvested to a refrigerating plant, and I have proposed in my co-pending application referred to above the expedient which consists in sprinkling the grapes, while still attached to the vine or shortly after gathering, with a strong solution of $SO_2$ in fresh water. This treatment is effective for some varieties of grapes and will kill the spores of the ferments adhering to the skin, but with grapes of other varieties with a waxy covering, the solution did not adhere to the peel. I have discovered that a solution formed by dissolving 1% by weight of $SO_2$ in diluted grape juice, will adhere uniformly to the skin of the grapes and that grapes treated with this solution will keep without fermenting for several days.

When the grapes preserved from fermenting as aforesaid, reach the factory they are stemmed and crushed and the juice is separated from the peels.

It is a known fact that while some kinds of grapes such as, Lubrusca, Cordifolia, Rupestris, and others, contain enough acidity and sugarless extract to give an agreeable and somewhat sour taste to drinks prepared therefrom, but other kinds of American grapes and nearly all of the European varieties (vitis vinifera), especially those cultivated in a warm climate contain too much sugar and not enough color, acidity, pectin, vitamine, and other ormonogens to make a drink having the desired slightly sour taste. I have discovered that when the grapes have been stemmed and crushed, the sugary portion of the grape, which is in the center, can be separated from the juice contained in the pulp near the skin, by pressing the crushed grapes very lightly. By careful pressing I can thus obtain from 30 to 50% by weight of almost colorless grape juice and a separate quantity of extract, the two products having very different qualities suiting them for different purposes. Of the colorless grape juice which is first obtained can be made sweet grape syrups, honey, jellies, or marmalade; while the juice obtained from the pulp near the peels will produce a non-alcoholic wine very rich in color, acidity and extract, having the taste and healthful ingredients of natural grapes. By this means it becomes possible to produce from the sweeter varieties of grapes a non-alcoholic wine of much better quality than would be produced by the whole grape as heretofore.

Having pressed out the sweetish juice contained in the center of the grapes I then systematically exhaust the peels and the pulp adhering thereto with luke warm water at about 45° C., in the manner described in my patent referred to above; but in order to prevent fermentation and to completely dissolve the coloring matter I add $SO_2$ to the water in the proportion of about one of the former and one thousand of the latter. This is an important feature and will largely prevent, not only fermentation but separation of the coloring matter from the finished product when warmed in contact with the air or diluted with several times its weight of water or soda water. The $SO_2$ will remain dissolved if the temperature is not raised above 50° C.

When the step of exhausting the peels is completed I cool the extract and filter it or allow it to stay in a cool place and if necessary add about one part of tannic acid to one thousand of the extract in case the extract does not contain enough of the acid. I then clarify the extract repeatedly with gelatin and filter in contact with the air in a cool room. Thereafter I concentrate the extract, preferably in a luke warm water concentrator, to a specific weight of about 1300 to 1400 grams per liter under an absolute pressure of not more than 50 mm. Hg. The $SO_2$ would be very injurious if left in the product but according to my process, it will combine with the tannic acid and separate out with the gelatin, and should a trace of it remain in the extract it will volatilize during the concentration in vacuum referred to above.

A product prepared as described above from scented white grapes such as Muscadine, will retain its original flavor and be very rich in non-sugary extract. If red grapes be used the extract will be highly colored and of unchangeable quality. Whatever kind of grape is used all the acids, salts, enzyms of the original grapes will be preserved in unaltered form. The extract prepared as above can be utilized by mixing from 5 to 10% of it with sterile grape juice, which will improve the taste by rendering it less sweet and adding the slight sour taste, which consumers like, as well as the wholesome ingredients which are good for them. Another advantage of the extract prepared as above is that it can be mixed with about two times its weight of concentrated grape juice so that the mixture will have a specific weight of 1300 to 1400 grams per liter, in which condition it will keep for a long time even in a warm place and can be transported in barrels, demijohns or the like without deterioration.

I claim:

1. In processes for treating grapes, the step which consists in sprinkling the fresh grapes with a solution of $SO_2$ in diluted grape juice.

2. The process of treating grape pomace which consists in systematically exhausting said pomace with luke warm water at a temperature from 35 to 50° C. and containing about one part of free $SO_2$ in one thousand parts of water, then cooling and clarifying the extract thus obtained.

3. In the process of treating grape pomace as set forth in claim 2, the step of eliminating any residual $SO_2$ which consists in adding tannic acid, if necessary in order to bring the total content of such acid up to about one part in one thousand, and clarifying the extract by adding gelatin.

4. The process of preparing a beverage from grape pomace which consists in systematically exhausting the pomace with luke warm water at a temperature from 35 to 50° C. and containing about one part of free $SO_2$ in one thousand parts of water, clarifying the extract thus obtained and removing the free $SO_2$, concentrating the extract in vacuum and mixing a relatively small quantity of the extract with a larger quantity of concentrated grape juice.

5. The process of making a beverage from sweet grapes which consists in stemming and crushing the grapes, lightly pressing the crushed grapes to separate the juice contained in the center from the juice contained in the pulp near the skin and systematically exhausting the skins and pulp with luke warm water at a temperature from 35 to 50° C. and containing free $SO_2$ in the proportion of one part to one thousand parts of water.

The foregoing specification signed at Turin, Italy, this sixteenth day of October, 1919.

EUDO MONTI.

In presence of two witnesses:
Joseph L. Slavin,
Henrietta Delfomo.